(12) United States Patent
Ragan

(10) Patent No.: US 12,187,543 B2
(45) Date of Patent: Jan. 7, 2025

(54) SELF-CLEARING TRAY CONVEYOR

(71) Applicant: Laitram, L.L.C., Harahan, LA (US)

(72) Inventor: Bryant G. Ragan, Metairie, LA (US)

(73) Assignee: Laitram, L.L.C., Harahan, LA (US)

( * ) Notice: Subject to any disclaimer, the term of this patent is extended or adjusted under 35 U.S.C. 154(b) by 117 days.

(21) Appl. No.: 18/011,055

(22) PCT Filed: Jun. 17, 2021

(86) PCT No.: PCT/US2021/037857
§ 371 (c)(1),
(2) Date: Dec. 16, 2022

(87) PCT Pub. No.: WO2022/015460
PCT Pub. Date: Jan. 20, 2022

(65) Prior Publication Data
US 2023/0227264 A1    Jul. 20, 2023

Related U.S. Application Data

(60) Provisional application No. 63/052,247, filed on Jul. 15, 2020.

(51) Int. Cl.
*B65G 45/12* (2006.01)
*B65G 35/06* (2006.01)
*B65G 54/02* (2006.01)

(52) U.S. Cl.
CPC ............. *B65G 35/06* (2013.01); *B65G 45/12* (2013.01); *B65G 54/02* (2013.01); *B65G 2207/26* (2013.01)

(58) Field of Classification Search
CPC ........ B65G 35/06; B65G 45/12; B65G 54/02; B65G 2207/26; B65G 47/34; B65G 47/96; B65G 47/962; B65G 39/073; B65G 45/005; B65G 45/10; B65G 17/12; B65G 25/02; B60L 13/03; B60L 2200/44; Y02P 90/60
USPC ......................................................... 198/618
See application file for complete search history.

(56) References Cited

U.S. PATENT DOCUMENTS

| | | | |
|---|---|---|---|
| 9,394,114 B2 | 7/2016 | Hanisch et al. |
| 9,446,902 B2 | 9/2016 | Aumann et al. |
| 9,499,357 B2 | 11/2016 | Aumann et al. |
| 9,997,985 B2 | 6/2018 | Prussmeier |
| 10,308,437 B2 | 6/2019 | Clossner et al. |
| 10,336,559 B2 | 7/2019 | Koga et al. |
| 10,569,974 B2 | 2/2020 | Neubauer |
| 10,587,212 B1 | 3/2020 | Van Dorpe et al. |
| 10,618,749 B2 | 4/2020 | Clossner et al. |
| 10,734,880 B2 | 8/2020 | Urata |

(Continued)

FOREIGN PATENT DOCUMENTS

EP    2025628 A2 *  2/2009  ........... B65G 47/844

*Primary Examiner* — Gene O Crawford
*Assistant Examiner* — Muhammad Awais
(74) *Attorney, Agent, or Firm* — James T. Cronvich

(57) ABSTRACT

A magnetic tray for a tray conveyor has a permanent-magnet array producing a magnetic field that interacts with an electromagnetic flux wave produced by a linear-motor stator to propel the tray in a conveying direction. The tray includes a top conveying platform supported on a mover housing the permanent-magnet array and a tray-clearing tool that removes conveyed articles or debris from the platform. The tray-clearing tool is powered by the stator.

16 Claims, 5 Drawing Sheets

(56) References Cited

U.S. PATENT DOCUMENTS

| | | |
|---|---|---|
| 10,759,613 B2 | 9/2020 | Neubauer |
| 10,781,854 B2 | 9/2020 | Neufeld et al. |
| 2010/0320062 A1* | 12/2010 | Van Den Goor .... B65G 47/844 198/890.1 |
| 2014/0309768 A1* | 10/2014 | Groot ........................ B07C 5/34 700/223 |
| 2017/0247201 A1* | 8/2017 | Prüssmeier .......... H02K 41/031 |
| 2020/0195049 A1 | 6/2020 | Floresta et al. |

* cited by examiner

SELF-CLEARING TRAY CONVEYOR

BACKGROUND

The invention relates generally to power-driven conveyors and in particular to self-clearing tray conveyors.

Tray conveyors are used to transport articles along a conveying line through one or more processing stations on individual trays. The trays are propelled along the conveying line by a chain or by magnetics. Especially when the trays are conveying food products, remnants of food products and other debris can contaminate the conveyed products.

SUMMARY

One version of a conveyor tray comprises a platform having a top conveying surface, a tray-clearing tool to clear articles and debris from the top conveying surface, and a mover supporting the platform and including a permanent-magnet array producing a magnetic field.

Another version comprises a platform having a top conveying surface, a sweeper, and an actuator coupled to the sweeper to move the sweeper along the top conveying surface to clear the top conveying surface of articles or debris.

Yet another version comprises a platform having a top conveying surface, a tray-clearing tool to clear articles and debris from the top conveying surface, and a pickup coil attached to the mover to transfer power to the tray-clearing tool.

One version of a tray conveyor comprises a conveyor tray and a linear-motor stator defining a conveying path for the conveyor tray. The conveyor tray includes a platform having a top conveying surface, a tray-clearing tool to clear articles and debris from the top conveying surface, and a mover supporting the platform and including a permanent-magnet array producing a magnetic field. The stator produces an electromagnetic flux wave that interacts with the magnetic field of the permanent-magnet array in the mover to propel the conveyor tray along the conveying path.

DETAILED DESCRIPTION

Figure 1:
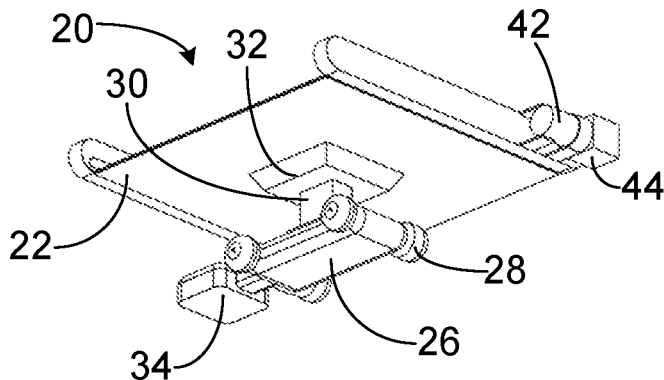
FIG. 1 is a bottom isometric view of one version of a conveyor tray.
Figure 2:
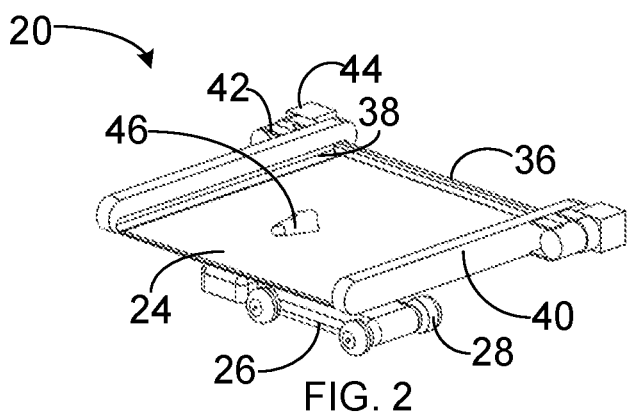
FIG. 2 is a top isometric view of the tray of FIG. 1.
Figure 3A:
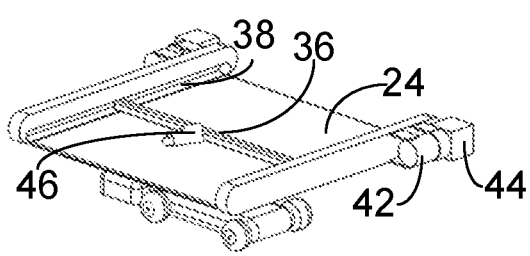
FIGS. 3A and 3B are isometric views of the tray of FIG. 2 in two tray-clearing states.
Figure 3B:
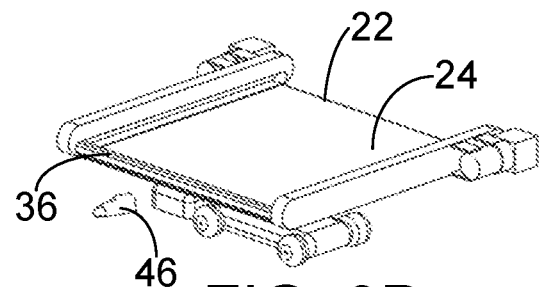

One embodiment of a magnetic conveyor tray is shown in FIGS. 1 and 2. The tray 20 comprises a platform 22 having a top conveying surface 24 on which articles are conveyed. The platform 22 is supported on a mover 26. The mover 26 has wheels 28 at its four corners. A post 30 extends from the top of the mover to a base 32 on the bottom side of the platform 22. The mover 26 also has an array of permanent magnets used in propelling the tray 20 along the length of the conveyor. And the mover 26 has an attached pickup enclosure 34 housing a power pickup coil. A tray-clearing tool in the form of a translating sweeper 36 is attached at opposite ends to belts 38 enclosed in belt guards 40 that extend across the width of the platform 22 along opposite ends. The belts 38 are driven by actuators that include drive motors 42, gearboxes 44 and pulleys at one end. As shown in FIGS. 3A and 3B, the sweeper 36 is translated linearly by the belts 38 along the top conveying surface 24 from one lateral side of the platform 22 to the other to clear the platform of conveyed articles 46 or debris.

Figure 4:
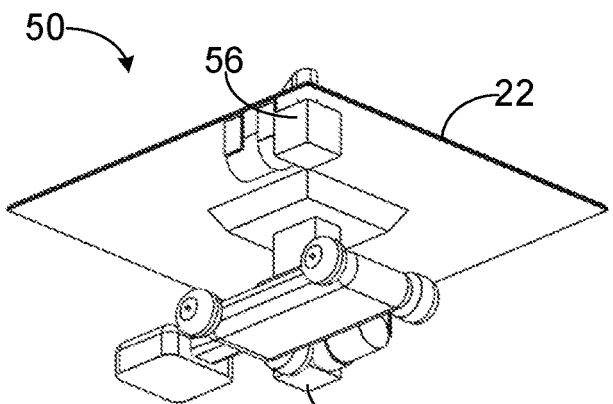
FIG. 4 is a bottom isometric view of another version of a conveyor tray.
Figure 5:
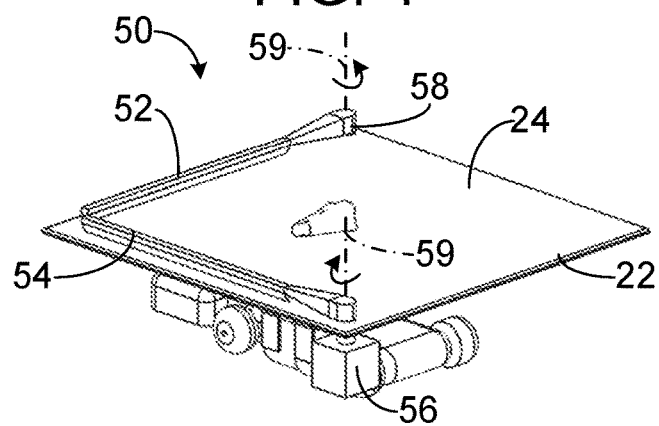
FIG. 5 is a top isometric view of the tray of FIG. 4.
Figure 6A:
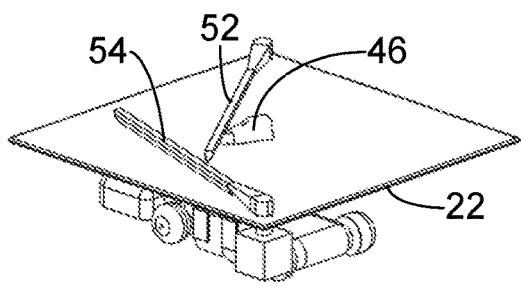
FIGS. 6A and 6B are isometric views of the tray of FIG. 5 in two tray-clearing states.
Figure 6B:
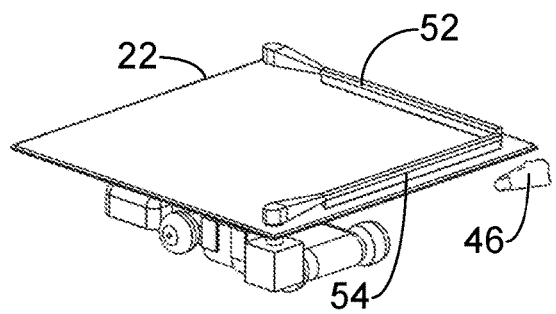

Another version of a conveyor tray is shown in FIGS. 4 and 5. The tray 50 is the same as the tray 20 of FIG. 1, except for the tray-clearing tool. Instead of a belt-driven, linearly translated sweeper 36 as in FIG. 1, the clearing tool of the tray 50 has two wiper blades 52, 54 that operate together as sweeper arms to clear the top conveying surface 24. The wiper blades 52, 54 are attached to wiper motors and gearboxes 56 at opposite corners of the tray platform 22. The wiper motors and gearboxes 56 are attached to pivot ends 58 of the sweeper blades 54 at pivot points. The blades 52, 54 are actuated by the wiper motors 56 to rotate about the motors' drive axes 59. FIGS. 5, 6A, and 6B depict the tray-clearing sequence for removing an article 46 from the platform 22.

Figure 7:
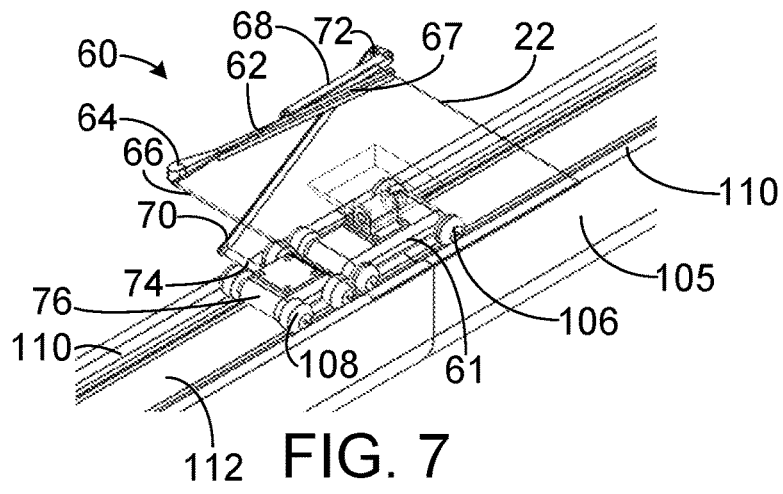
FIG. 7 is a top isometric view of another version of a conveyor tray riding on a tray conveyor with the tray's platform shown transparent.

Yet another version of a conveyor tray 60 is shown in FIG. 7 with the platform 22 shown transparent. The platform 22 is supported on a platform mover 61 and uses a single wiper blade 62 as a sweeper arm in its tray-clearing tool. The wiper blade 62 is pivotally attached at a pivot end 64 to the platform 22 at a pivot point in one corner along a leading edge 66 of the tray 60. The wiper blade 62 forms a first bar 67, or link, in a two-bar Scott-Russell linkage on the top conveying surface 24. A second bar 68 is a drive bar pivotally joined at one end to the first bar 67 at its middle. The other end of the drive bar 68 is attached to a rocker 70 at a two-axis joint 72. The other end of the rocker 70 is pivotally attached to a fixed link 74 on a second mover 76.

Figure 8A:
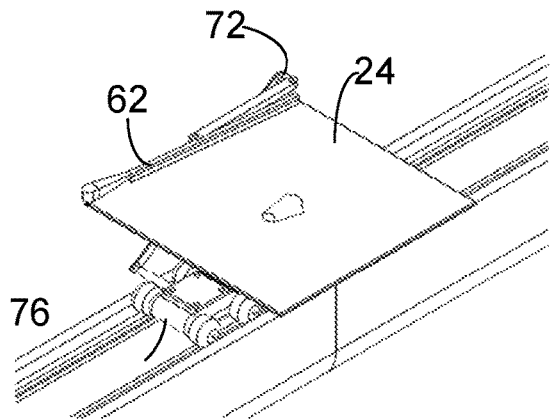
FIGS. 8A-8C are isometric views of the tray conveyor of FIG. 7 showing a sequence of tray-clearing states.
Figure 8B:
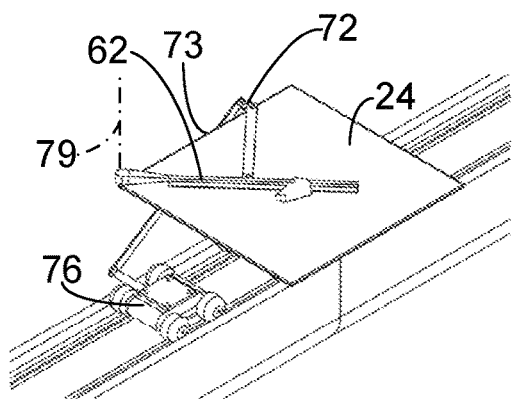
Figure 8C:
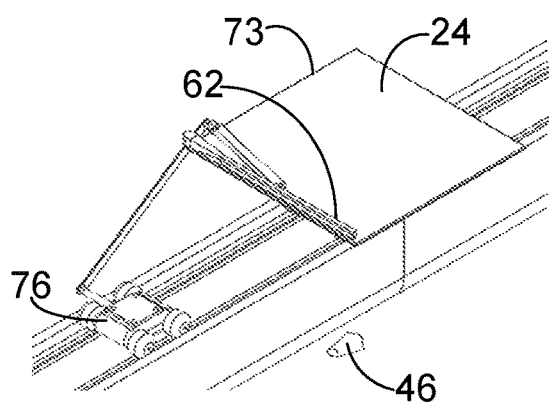

As shown in the sequence of FIGS. 8A-8C, the sweeper 62 is swept across the top conveying surface 24 by the forward motion of the second mover 76 relative to the platform mover 61. The forward motion causes the two-axis joint 72, which is constrained to linear movement along a side edge 73 of the platform 22, to push the sweeper 62 away from the side edge by pivoting about a pivot axis 79 perpendicular to the top surface 24 at the sweeper blade's pivot end 64 at the pivot point. In that way the motion of the second mover 76 relative to the platform mover 61 actuates the sweeper 62 of the tray-clearing tool to sweep articles 46 or debris from the top conveying surface 24. Thus, the second mover 76 and the linkage compose the actuator for this tray-clearing tool.

Figure 9A:
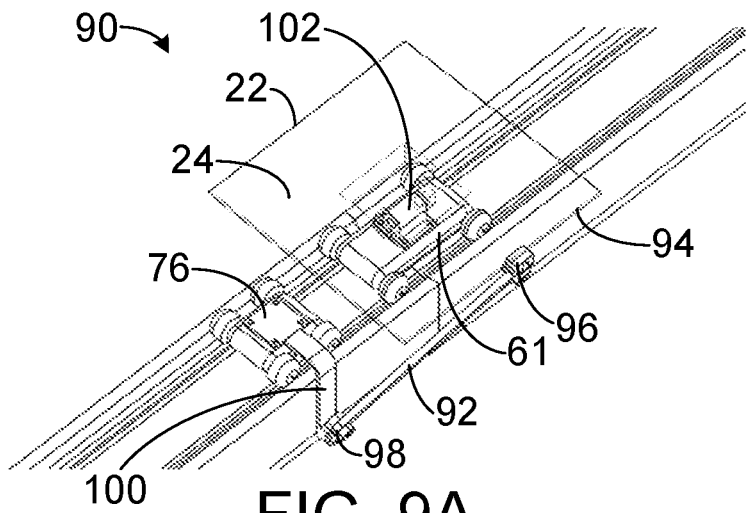
FIGS. 9A-9C are isometric views of another version of a conveyor tray shown transparent in a sequence of tray-clearing states.
Figure 9B:
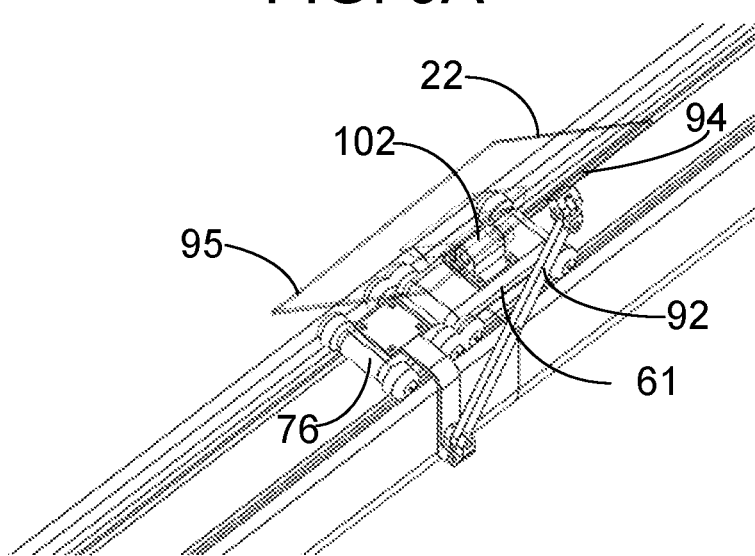
Figure 9C:
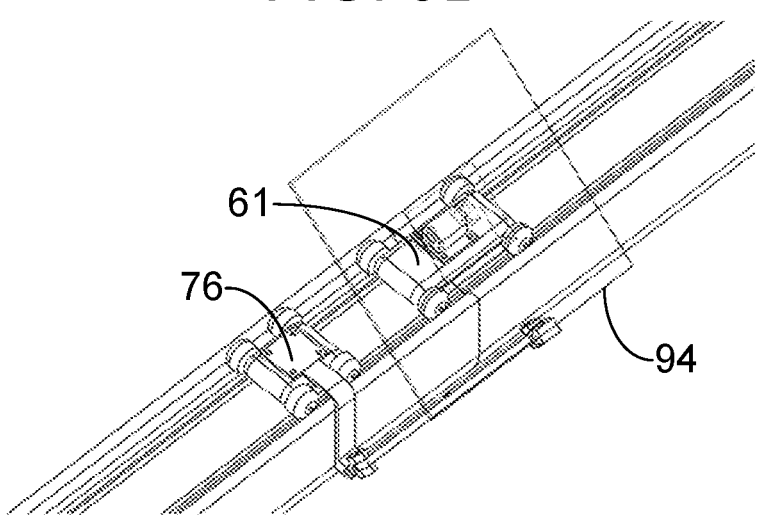

FIGS. 9A-9C illustrate the operation of a magnetic tilt tray 90 in clearing its top conveying surface 24. The tray's platform 22 is supported on a platform mover 61 as in the tray 60 of FIG. 7. A rocker 92 is attached at one end to the platform 22 along a first lateral side 94 by a two-axis joint 96. The other end is attached to a single-axis pivot joint 98 affixed to an arm 100 that extends away and down from a second mover 76 as in the tray 60 of FIG. 7. The platform 22 is pivotally attached to the platform mover 61 by a pivot 102 on the mover.

In FIG. 9A the second mover 76, which serves, together with the rocker 92, the joint 96, and the arm 100, as the actuator of the tray-clearing tool, is spaced from the platform mover 61 by a first distance that maintains the platform 22 level, i.e., in a horizontal plane, for normal conveying operation. In FIG. 9B the second mover 76 is shown spaced from the platform mover 61 by a lesser second distance that causes the rocker 92 to raise the lateral side 94 and tilt the platform 22 about the pivot 102 to slide articles or debris off the opposite second lateral side 95. In FIG. 9C the second mover 76 is spaced from the platform mover 61 by a third distance greater than the first distance in FIG. 9A to pull the first lateral side 94 down and tilt the platform 22 to slide articles or debris off the first lateral side.

Figure 10:
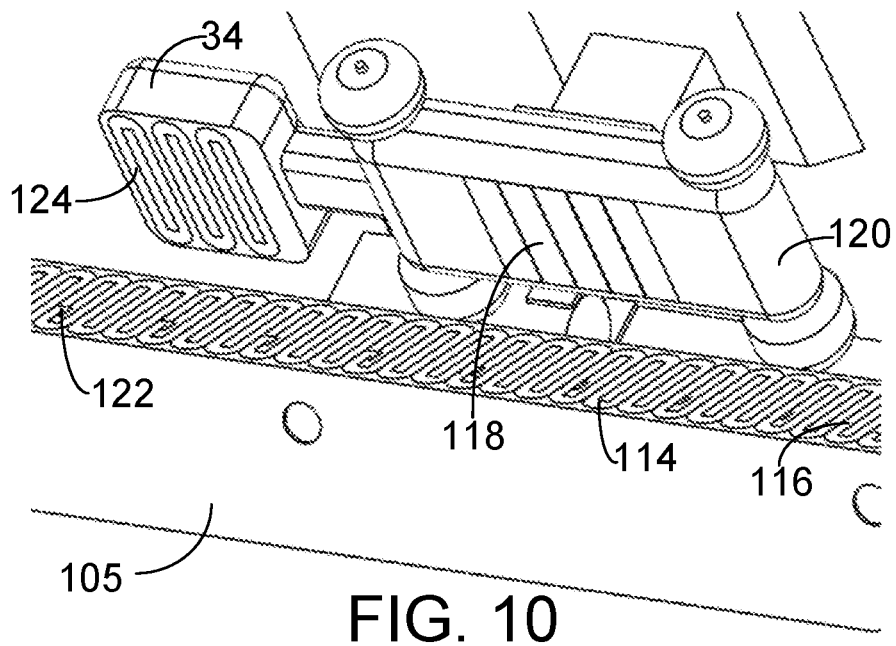
FIG. 10 is an axonometric view of a linear-motor stator in a tray conveyor and a conveyor tray as in FIG. 4 shown tilted to reveal a permanent magnet array and pickup coils.

As shown in FIGS. 7-9C, the trays 60, 90 are shown riding in a tray conveyor 105. With reference to FIG. 7, wheels 106, 108 on the platform mover 61 and the second mover 76 ride in tracks 110 flanking a central stator housing 112. As shown in FIG. 10, the stator housing includes a linear-motor stator 114 composed of stator coils 116 extending along the length of the conveyor 105. The stator coils 116 propagate an electromagnetic flux wave along the tray conveyor 105 that interacts with the magnetic field of an array of permanent magnets 118 in the bottom of the platform movers 120. The magnet array 118 can be a Halbach array for a stronger magnetic-field interaction with the stator's electromagnetic flux wave. The interaction propels the mover 120 in a conveying direction along the conveyor 105. Position sensors 122 are also mounted in the conveyor at sensor positions along the conveying path to detect the presence of a mover. The second movers, which also have permanent magnet arrays, are similarly propelled by the stator 114. Together the stator coils 116 and the permanent-magnet arrays in the movers form linear synchronous motors.

Figure 11:
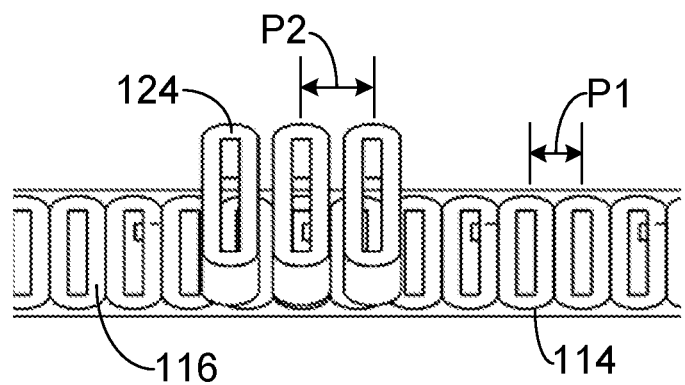
FIG. 11 is a top plan view of the stator of FIG. 10 showing the spatial relationship between the stator coils and the pickup coils.

Power is transferred inductively from the stator coils 116 through power pickup coils 124 in the pickup enclosure 34. As shown in FIG. 11, the pitch P1 of the stator coils 116 differs from the pitch P2 of the power pickup coils 124 to smooth the power variation and cancel translation forces as the pickup coils advance along the stator 114.

Figure 12:
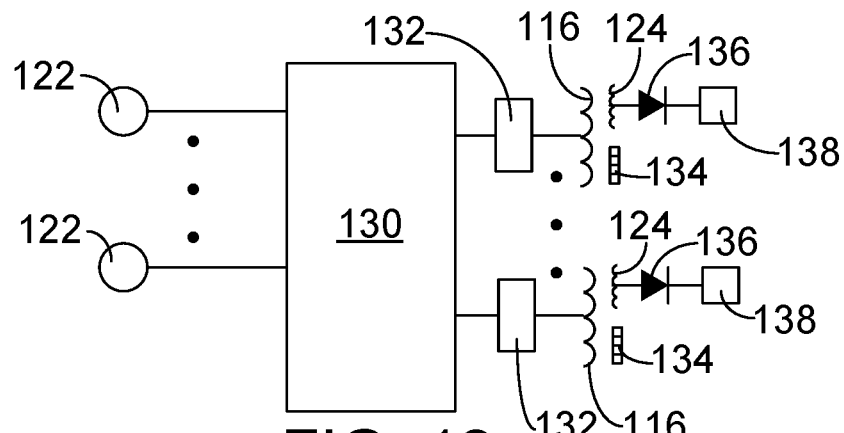
FIG. 12 is a block diagram of a control system for a tray conveyor as in FIG. 10.

A control system for controlling the trays on a tray conveyor is shown in FIG. 12. The system is controlled by a main processor 130, such as a microprocessor or other programmable device executing program instructions stored in program memory. The processor 130 receives inputs from the position sensors 122 positioned along the length of the conveyor. The stator coils 116 are segmented along the length of the conveyor with each segment driven by a dedicated coil driver 132, such as a three-phase coil driver. In that way the processor 130 can cause each segment to propel the movers 134 at different speeds. For the dual-mover trays of FIGS. 7-9C, the processor accelerates and decelerates the second movers relative to the platform movers to actuate the tray-clearing tools and return them to their home positions for normal operation.

The stator coils 116 also induce ac voltages in the power pickup coils 124 in the pickup coil enclosures. The induced secondary voltage in the power pickup coils 124 is rectified in rectifiers 136 to produce a dc voltage that drives the tray-clearing actuators 138 (the wiper motors and gearboxes 56 of FIG. 4 or the belt motors 42 and gearboxes 44 of FIG. 1).

Although features of the invention have been shown in exemplary versions of a tray conveyor, other version are possible. For example, the sweeper may be, instead of a flexible wiper, a more rigid scraper, a brush, or a sponge. And other arrangements of sweepers and other kinds of actuators are possible. For example, a pickup coil and sweeper and actuator as in the conveyor tray 20 of FIG. 1 or the conveyor tray 50 of FIG. 4 could be added to the magnetic tilt tray 90 of FIGS. 9A-9C to provide supplemental sweeping of the top conveying surface. So, as these few examples suggest, the scope of the claims is not meant to be limited to the details of the exemplary versions described in detail.

What is claimed is:

1. A conveyor tray comprising:
   a platform having a top conveying surface;
   a first mover supporting the platform and including a permanent-magnet array producing a magnetic field;
   a tray-clearing tool to clear articles and debris from the top conveying surface and including:
   a second mover having a permanent-magnet array; and
   a linkage connected between the second mover and the platform to tilt the platform by the movement of the second mover relative to the first mover to clear articles and debris by gravity.

2. A conveyor tray as claimed in claim 1 wherein the tray-clearing tool includes a sweeper arm and an actuator connected to the sweeper arm to move the sweeper arm across the top conveying surface of the platform.

3. A conveyor tray as claimed in claim 1 comprising a pickup coil attached to the second mover to transfer power to the tray-clearing tool.

4. A tray conveyor comprising:
   a conveyor tray as claimed in claim 1 and;
   a linear-motor stator defining a conveying path for the conveyor tray and producing an electromagnetic flux wave that interacts with the magnetic field of the permanent-magnet array in the first mover to propel the conveyor tray along the conveying path.

5. A tray conveyor as claimed in claim 4 wherein the conveyor tray includes a pickup coil inductively coupled to the linear-motor stator to transfer power from the linear-motor stator to the tray-clearing tool.

6. A tray conveyor as claimed in claim 4 comprising a controller controlling the linear-motor stator to propel the first mover supporting the platform and the second mover at the same speed when the tray-clearing tool is deactivated and to propel the first mover supporting the platform and the second mover independently when the tray-clearing tool is activated to clear articles and debris from the top conveying surface of the platform.

7. A conveyor tray comprising:
   a platform having a top conveying surface;
   a sweeper including a sweeper arm with a pivot end pivotally attached to the platform at a pivot point and
   an actuator connected to the sweeper arm to pivot the sweeper arm about the pivot point across the top conveying surface of the platform to clear articles and debris.

8. A conveyor tray as claimed in claim 7 wherein the top conveying surface is rectangular and the pivot point is in a corner of the top conveying surface.

9. A conveyor tray as claimed in claim 7 comprising a second sweeper and a second actuator coupled to the second sweeper to pivot the sweeper about a second pivot point on the top conveying surface in coordination with the other sweeper.

10. A conveyor tray as claimed in claim 7 wherein the sweeper includes a sweeper arm and the actuator includes a linkage bar pivotably connected to a middle portion of the sweeper arm.

11. A conveyor tray as claimed in claim 7 comprising a mover supporting the platform and including a permanent-magnet array.

12. A conveyor tray as claimed in claim 11 comprising a pickup coil attached to the mover to transfer power to the actuator.

13. A conveyor tray as claimed in claim 7 wherein the sweeper includes a scraper blade, a brush, a wiper blade, or a sponge.

14. A conveyor tray comprising:
a platform having a top conveying surface;
a first mover including a permanent-magnet array and supporting the platform;
a tray-clearing tool including a sweeper attached to the platform at a fixed pivot point about which the sweeper pivots to clear articles and debris from the top conveying surface;
a pickup coil attached to the mover to transfer power to the tray-clearing tool.

15. A conveyor tray as claimed in claim 14 wherein the sweeper includes a sweeper arm and an actuator connected to the sweeper arm to pivot the sweeper arm about the fixed pivot point across the top conveying surface of the platform.

16. A conveyor tray as claimed in claim 14 comprising a second mover including a permanent-magnet array and connected to the tray-clearing tool.

* * * * *